United States Patent [19]

Wamprecht et al.

[11] Patent Number: 4,990,583

[45] Date of Patent: Feb. 5, 1991

[54] COPOLYMERS CONTAINING ISOCYANATE AND ACID ANHYDRIDE GROUPS, A PROCESS FOR THEIR PREPARATION AND THEIR USE AS A BINDER COMPONENTS

[75] Inventors: Christian Wamprecht, Neuss; Josef Pedain, Cologne; Harald Blum, Wachtendonk, all of Fed. Rep. of Germany

[73] Assignee: Bayer Aktiengesellschaft, Leverkusen, Fed. Rep. of Germany

[21] Appl. No.: 305,744

[22] Filed: Feb. 3, 1989

[30] Foreign Application Priority Data

Feb. 13, 1988 [DE] Fed. Rep. of Germany ....... 3804589

[51] Int. Cl.$^5$ .............................................. C08F 122/04
[52] U.S. Cl. ...................................... 526/271; 526/304
[58] Field of Search ................................ 526/271, 301

[56] References Cited

U.S. PATENT DOCUMENTS 4,861,853 8/1989 Petrie et al. .......................... 526/301

FOREIGN PATENT DOCUMENTS 1161352 3/1967 United Kingdom ................ 526/271

*Primary Examiner*—Joseph L. Schofer
*Assistant Examiner*—Alex H. Walker
*Attorney, Agent, or Firm*—Connolly and Hutz

[57] ABSTRACT

Copolymers useful in binders for two-component coating compounds or sealing compounds are copolymers having a weight average molecular weight, determined by the gel permeation chromatography method, of from 1500 to 75,000 of olefinically unsaturated compounds containing chemically incorporated moieties capable of undergoing an addition reaction with hydroxyls wherein the copolymers contain, as hydroxyl reactive groups, both (i) from 0.3 to 7.0% by weight of free isocyanate groups and (ii) from 1 to 25% by weight of acid anhydride groups, calculated as $C_4H_2O_3$, in a chemically bound form.

4 Claims, No Drawings

COPOLYMERS CONTAINING ISOCYANATE AND ACID ANHYDRIDE GROUPS, A PROCESS FOR THEIR PREPARATION AND THEIR USE AS A BINDER COMPONENTS

This invention relates to new copolymers which contain both free isocyanate groups and intramolecular acid anhydride groups in a chemically incorporated form, to a process for the preparation of these copolymers and to their use as binder components in two-component coating compounds or sealing compounds.

BACKGROUND OF THE INVENTION

It is already known to use combinations of polyhydroxyl compounds and organic compounds containing at least two intramolecular carboxylic acid anhydride groups per molecule, in particular copolymers containing succinic acid anhydride, as binders for lacquers and coating compounds.

Coating compositions consisting of hydroxyl functional polymers and an ester anhydride containing at least two anhydride groups per molecule, in which the ester anhydride is an oligomer of trimellitic anhydride, are described in FR-A-2 392 092. The disadvantages of these compositions are not only the very poor solubility of the anhydride component in the solvents conventionally used for lacquers but also the imcompatibility with hydroxyl functional polymers.

EP-A-48 128 describes a coating composition consisting of a hydroxyl component having at least two hydroxyl groups per molecule, an anhydride component having at least two anhydride groups per molecule and an amine component. The use of monomeric aminoalcohols such as triethanolamine as cross-linking reagents as described in the said specification has a very deleterious effect on the solvent resistance of the resulting lacquers if a sufficiently long pot life is required, since the latter can only be achieved at the expense of a low cross-linking density which results in lacquer films with little resistance to solvents. Even when relatively high molecular weight polyols are used, e.g. hydroxyfunctional polyacrylate resins, it is hardly possible to obtain a sufficiently long pot life of the systems for practical purposes.

The use of combinations of organic compounds, in particular those based on polymers containing at least two isocyanate groups per molecule and poylhydroxyl compounds, as binders for lacquers and coatings is described, for example, in DE-A-2 014 383, U.S. Pat. Nos. 4,219,632, 4,264,748, DE-A-3 004 527, EP-A-130 313 and EP-A-130 322. Coatings based on these combinations all have excellent properties as lacquers but these copolymers containing isocyanate groups have the disadvantage of insufficient stability in storage due to their high isocyanate functionality and their high molecular weight. Hydrolysis of the isocyanate groups to amino groups proceeds rapidly, especially in the presence of atmospheric moisture, and is followed by very rapid molecular weight degradation and viscosity increase to the point of gelling.

BRIEF DESCRIPTION OF THE INVENTION

It was therefore an object of the present invention to provide new copolymers containing hydroxyl reactive groups and capable of being combined with organic polyhydroxyl compounds to form high quality binders which harden at room temperature and are distinguished by a sufficiently long pot life and enable clear, colourless coatings to be obtained which are solvent-resistant and resistant to yellowing.

This problem has been solved by a copolymer having a weight, determined by the gel permeation chromatography method, of from 1500 to 75,000 of olefinically unsaturated compounds containing chemically incorporated moieties capable of undergoing an addition reaction with hydroxyls wherein the copolymers contain, as hydroxyl reactive groups, both (i) from 0.3 to 7.0% by weight of free isocyanate groups and (ii) from 1 to 25% by weight of acid anhydride groups, calculated as $C_4H_2O_3$, in a chemically bound form.

DETAILED DESCRIPTION

The present invention relates to copolymers having a weight average molecular weight of from 1500 to 75,000 of olefinically unsaturated compounds containing chemically incorporated groups capable of undergoing an addition reaction with hydroxyl groups, characterised in that the copolymers contain (i) from 0.3 to 7.0% by weight of free isocyanate groups and (ii) from 1 to 25% by weight of acid anhydride groups (calculated as $C_4H_2O_3$)

as reactive hydroxyl groups in a chemically bound form.

This invention also relates to a process for the preparation of these copolymers by the copolymerisation of a mixture of olefinically unsaturated compounds at 60° to 200° C. in the presence of compounds which initiate the polymerisation reaction, characterised in that the mixture of olefinically unsaturated compounds used is one which in addition to containing monomers free from isocyanate groups and acid anhydride groups contains (i) olefinically unsaturated acid anhydrides and (ii) olefinically unsaturated isocyanates in such quantities that the monomer mixture contains from 0.3 to 7.0% by weight of isocyanate groups and from 1 to 25% by weight of anhydride groups (calculated as $C_4H_2O_3$).

The invention also relates to the use of these copolymers as binder components in two-component coating compounds or sealing compounds which contain organic polyhydroxyl compounds as additional binder components.

The copolymers according to the invention have a weight average molecular weight, determined by the method of gel permeation chromatography, of from 1500 to 75,000, preferably from 3000 to 50,000, most preferably from 3000 to 25,000. The copolymers contain both chemically incorporated isocyanate groups in a quantity of from 0.3 to 7.0% by weight, preferably from 0.5 to 5.0% by weight, and chemically incorporated intramolecular acid anhydride groups corresponding to the following formula:

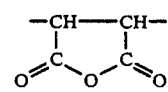

a quantity of from 1 to 25% by weight, preferably from 3 to 15% by weight. These copolymers are based on monomers which are preferably mono-olefinically unsaturated. Three groups of olefinically unsaturated monomers may be used in the process according to the invention as starting materials for the preparation of the copolymers, namely (a) olefinically unsaturated monomers containing isocyanate groups, (b) olefinically unsaturated monomers containing intramolecular acid anhydride groups and (c) olefinically unsaturated monomers which are free from isocyanate groups and from acid anhydride groups. Monomers (a) are generally used in a quantity of from 1 to 25 parts by weight, preferably from 2 to 15 parts by weight, monomers (b) in a quantity of from 1 to 25 parts by weight, preferably from 3 to 15 parts by weight, and monomers (c) in a quantity of from 50 to 98 parts by weight, preferably from 70 to 95 parts by weight and in addition care should be taken to ensure that the proportions of the individual monomers in the mixture which is to be copolymerised are calculated to result in copolymers which contain the above-mentioned quantities of chemically incorporated isocyanate groups and acid anhydride groups. The proportion of these groups in the copolymers corresponds to the proportions of the same groups in the monomer mixture since it may be assumed that the copolymers are similar in their chemical composition to the monomer mixture.

The monomers (a) are mono-olefinically unsaturated mono- or polyisocyanates, preferably mono- or diisocyanates, preferably having a molecular weight of from 69 to 400 and containing aliphatically or aromatically bound, preferably aliphatically bound isocyanate groups. Examples of suitable monomers include isocyanatoethylacrylate, isocyanatoethylmethacrylate, bis-(2-isocyanatoethyl)-fumarate, m-isopropenyl-$\alpha,\alpha$-dimethylbenzylisocyanate, allylisocyanate, vinylisocyanate and methacryloylisocyanate but also monoadducts of polymerisable hydroxyl compounds and diisocyanates, such as the reaction product of 1 mol of 1,6-diisocyanatohexane or of 1 mol of 1-isocyanato-3,3,5-trimethyl-5-isocyanatomethyl-cyclohexane with 1 mol of 2-hydroxyethylacetate. Isocyanatoethylmethacrylate, bis-(2-isocyanatoethyl)-fumarate and m-isopropenyl-$\alpha,\alpha$-dimethyl-benzylisocyanate are preferred monomers (a). Typical examples of monomers (b) include itaconic acid anhydride and maleic acid anhydride, maleic acid anhydride being preferred.

The monomers (c) generally have a molecular weight of from 86 to 400. They consist of the conventional, preferably monoolefinically unsaturated monomers free from isocyanate groups and acid anhydride groups of the type also used as monomers in the prior art process mentioned above. Typical examples include esters of acrylic and methacrylic acid such as methyl acrylate, ethyl acrylate, n-butyl acrylate, isobutyl acrylate, tert.-butyl acrylate, 2-ethyl-hexylacrylate, cyclohexylmethacrylate, methyl methacrylate, n-butylmethacrylate, isobutylmethacrylate and 2-ethyl-hexylmethacrylate; aromatic vinyl compounds such as styrene, vinyltoluene, $\alpha$-methylstyrene and $\alpha$-ethylstyrene, methoxystyrenes, butylstyrenes, isopropylstyrenes and diethylstyrenes which are substituted in the nucleus, optionally in the form of isomeric mixtures; vinyl ethers such as ethyl vinyl ether, n-propyl vinyl ether, isopropyl vinyl ether, n-butyl vinyl ether and isobutyl vinyl ether; vinyl esters, e.g. vinyl acetate, vinyl propionate and vinyl butyrate.

Any mixtures of the monomers (a) to (c) exemplified above may, of course, be used for carrying out the copolymerisation.

The preparation of the copolymers, i.e. the process according to the invention, may be carried out by copolymerising the above exemplified monomers (a) to (c) by conventional radical polymerisation processes such as solvent-free or solution polymerisation.

In these processes, the monomers are copolymerised at temperatures from 60° to 200° C., preferably at 80° to 160° C., in the presence of radical formers and optionally molecular weight regulators.

The process according to the invention is preferably carried out in inert solvents. Suitable solvents include, for example, aromatic solvents such as benzene, toluene or xylene; esters such as ethyl acetate, butyl acetate, methyl glycol acetate, ethyl glycol acetate and methoxypropyl acetate; ethers such as tetrahydrofuran, dioxane and diethylene glycol dimethylether; and ketones such as acetone, methyl ethyl ketone and methyl isobutyl ketone.

The process according to the invention may be carried out continuously or batchwise. The monomer mixture and the initiator are normally introduced at a uniform rate and continuously into a polymerisation reactor and at the same time the corresponding quantity of polymer is continuously removed. Chemically almost uniform copolymers may advantageously be prepared by this method. Chemically almost uniform copolymers may also be obtained by introducing the reaction mixture into a stirrer vessel at a constant velocity without removing the polymer.

Alternatively, part of the monomers may be introduced into the reaction vessel, for example as solutions in solvents of the type mentioned above, and the remaining monomers and auxiliary agents may then be added separately or together at the reaction temperature.

Polymerisation is generally carried out under a pressure of 1 to 20 bar. The initiators are used in quantities from 0.05 to 15% by weight, based on the total quantity of the monomers.

Examples of suitable initiators include the conventional radical starters such as aliphatic azo compounds, e.g. azodiisobutyric acid nitrile, azo-bis-2-methylvaleronitrile, 1,1'-azo-bis-1-cyclohexanenitrile and 2,2'-azo-bis-isobutyric acid alkyl esters; symmetric diacylperoxides, e.g. acetyl, propionyl and butyryl peroxide, lauryl peroxides, benzoyl peroxides substituted with bromine, nitro, methyl or methoxy groups; symmetric peroxydicarbonates, e.g. diethyl, diisopropyl, dicyclohexyl and dibenzoyl peroxydicarbonate; tert.-butyl-peroctoate, tert.-butylperbenzoate and tert.-butylphenylperacetate and peroxy carbonates such as tert.-butyl-N-(phenylperoxy)-carbonate or tert.-butyl-N-(2-, 3- or 4-chlorophenylperoxy)-carbonate; hydroperoxides such as tert.-butylhydroperoxide or cumene hydroperoxide; dialkylperoxides such as dicumylperoxide, tert.-butylcumylperoxide and di-tert.-butylperoxide.

Conventional regulators such as tert.-dodecylmercaptan, n-dodecylmercaptan or diisopropylxanthogen disulphide may be put into the process to regulate the molecular weight of the copolymers. These regulators may be added in quantities of from 0.1 to 10% by weight, based on the total quantity of the monomers.

The solutions of copolymers obtained from the copolymerisation reaction are suitable for the use according to the invention without further purification although they may, of course, be freed from any residues of unreacted monomers and solvents by distillation and the copolymers obtained as distillation residue may then be used for the purpose according to the invention.

The copolymers according to the invention are valuable binder components (A) for two-component binders. These binders according to the invention contain organic polyhydroxyl compounds (B) in addition to the copolymers (A) and optionally also catalysts (C) which accelerate the addition reaction between components (A) and (B).

The polyhydroxyl compounds (B) are compounds containing at least two hydroxyl groups per molecule and are preferably low molecular weight, aliphatic, cycloaliphatic or araliphatic polyols in the molecular weight range of from 62 to 500, preferably from 62 to 400, containing from 2 to 6, preferably 2 to 4 hydroxyl groups per molecule.

Relatively high molecular weight polyols in the molecular weight range of from 500 to 75,000, preferably from 600 to 50,000, with OH numbers from 20 to 700, preferably from 25 to 650, may also be used and are in fact particularly advantageous for certain fields of application.

Mixtures of the above mentioned low molecular weight and relatively high molecular weight compounds may also be used. Both polyhydroxyl compounds which are free from nitrogen and polyhydroxyl compounds containing tertiary amine nitrogen atoms may be used. When such amino alcohols are used, it is frequently unnecessary to add an additional catalyst component (C), since the tertiary amine nitrogen atoms incorporated in component (B) act as catalysts for the cross-linking reaction.

The following are examples of suitable nitrogen-free polyhydroxyl compounds: Ethylene glycol, the isomeric propanediols, butanediols, hexanediols, neopentyl glycol, cyclohexene-1,4-diol, cyclohexane dimethanol, bis-hydroxymethyl-hexahydro-4,7-methanoindane, polyglycols such as diethylene glycol, triethylene glycol, polyethylene glycols, dipropylene glycol, tripropylene glycol and polypropylene glycols and alkanetriols such as trimethylol propane and glycerol; alkyl tetrols such as pentaerythritol, reaction products of the above-mentioned hydroxyl compounds with ε-caprolactone, hydroxyl functional polyesters, polyethers and polyacrylates or mixtures thereof.

The following are examples of suitable polyols containing tertiary amine nitrogen: Bis-(2-hydroxyethyl)-methylamine, bis-(2-hydroxyethyl)-butylamine, tris-(2-hydroxyethyl)-amine, tris-2-(2-hydroxyethoxy)-ethylamine, bis-(2-hydroxypropyl)-methylamine, tris-(2-hydroxypropyl)-amine and particularly their reaction products with ε-caprolactone, reaction products of higher than difunctional polyhydroxyl compounds of the type exemplified above with monoisocyanates containing tertiary nitrogen atoms, for example, reaction products of (i) 1 mol of N,N-dimethylethanolamine with (ii) 1 mol of 1,6-diisocyanatohexane, 1-isocyanato-1-methyl-4(3)-isocyanatomethylcyclohexane or isophorone diisocyanate; or hydroxyfunctional copolymers containing tertiary nitrogen atoms, for example those prepared with hydroxyfunctional monomers such as hydroxyethylacrylate and aminofunctional monomers such as N,N-diethylaminoethylmethacrylate; and hydroxyfunctional and epoxyfunctional polymers which have been reacted with a dialkylamine such as dimethylamine; similarly reacted polyepoxides; reaction products of substances containing one tertiary and at least two primary or secondary amino groups and cyclic organic carbonates in such proportions that each primary or secondary amino group can be reacted with a carbonate group, e.g. reaction products of (i) 1 mol of bis-(3-aminopropyl)-methylamine and (ii) 2 mol of ethylene carbonate, propylene carbonate, glycerol carbonate or alkoxylation products of primary and/or secondary mono- or polyamines containing at least two NH bonds, such as, for example, the product of addition of 4 to 5 mol of propylene oxide to 1 mol of ethylene diamine or similarly prepared relatively high molecular weight aminopolyether polyols known in the art containing chemically incorporated tertiary nitrogen atoms.

The components (B) may consist of any mixtures of the nitrogen-containing and nitrogen-free polyhydroxyl compounds mentioned as examples. It may be advisable, especially when component (B) has no tertiary amine nitrogen atoms, to use catalysts (C) to accelerate the crosslinking reaction between the isocyanate and anhydride groups on the one hand and the hydroxyl groups on the other. These catalysts (C) are tertiary amines which are either inert towards isocyanate groups and acid anhydride groups or contain a group (hydroxyl group, primary or secondary amino group) which is reactive with isocyanate and acid anhydride groups. The following are examples of compounds which are suitable catalysts (C): Tertiary amines in the molecular weight range of from 73 to 300, such as ethyldimethylamine, diethylmethylamine, triethylamine, ethyldiisopropylamine, tributylamine, 1-methylpyrrolidine, 1-methylpiperidine, 1,4-dimethylpiperidine, 1,4-diazabicyclo[(2,2,2)]octane or 1,8-diazabicyclo[(5,4,0)] undec-7-ene, N,N-dimethylethanolamine, N,N-diethylpropanolamine, N,N-dibutylethanolamine, 1-amino-3-(dimethylamino)propane and 1-amino-2-(diethylamino)-ethane. Any mixtures of the tertiary amines mentioned above as examples may also be used as component (C).

To prepare the binders according to the invention, the components described above, i.e. the copolymers (A) containing the isocyanate and anhydride groups, the components (B) containing hydroxyl groups and optionally a catalytically active number of amino groups, and optionally the catalytic components (C), are mixed together. Alternatively, mixtures of various components (A) may be mixed with one or more of components (B) and/or (C).

The components are generally used in such proportions that from 0.2 to 5, preferably from 0.5 to 2 and most preferably from 0.8 to 1.2 groups capable of reacting with isocyanate and acid anhydride groups, preferably hydroxyl groups, are available for each isocyanate and acid anhydride group, any reactive groups present in component (C) being included in the calculation.

Any primary or secondary amino groups or hydroxyl groups present in component (C) react spontaneously with a proportion of the isocyanate and anhydride groups of component (A) to form urea, urethane, amide or ester groups so that these catalysts which are capable of being chemically incorporated are fixed in the coating ultimately obtained.

Inert solvents and diluents may be added to the individual components or to mixtures thereof before, during or after the components are mixed together. These solvents and diluents may also be added to one or more of the starting components during the preparation of the latter, for example as described above. The solvents and diluents mentioned above by way of example are also suitable for dissolving or diluting the individual components of the binders or the binder itself.

The solvents and diluents are generally used in such quantities that the binders ready for use are in the form of 40 to 80% by weight solutions.

The reaction temperatures and the compositions of Parts I to III are shown in Table I together with the characteristics of the copolymers obtained.

TABLE I

| Copolymers | (Quantities in g) | | | | | | |
|---|---|---|---|---|---|---|---|
| | $A_1$ | $A_2$ | $A_3$ | $A_4$ | $A_5$ | $A_6$ | $A_7$ |
| Part I | | | | | | | |
| Butyl acetate | 680 | 680 | 680 | | | 680 | 680 |
| Xylene | | | | 600 | 600 | | |
| Bis-(isocyanatoethyl)-fumarate | | | | | | 64 | 64 |
| Part II | | | | | | | |
| Cyclohexylmethacrylate | | | | | | | 410 |
| Ethyl acrylate | | | | | 336 | | |
| Butyl methacrylate | | | | | 600 | | |
| Butyl acrylate | 555 | 504 | 422 | | | | |
| Isobutylacrylate | | | | | | 410 | |
| tert.-butyl acrylate | | | | | | | 315 |
| Isobutyl methacrylate | | | | 532 | | | |
| Methyl methacrylate | 410 | 351 | 493 | | | | |
| 2-Ethylhexyl acrylate | | | | 368 | | | |
| Styrene | 58 | 94 | 116 | 190 | 150 | 234 | 212 |
| Maleic acid anhydride | 57 | 86 | 82 | 136 | 125 | 148 | 170 |
| Isocyanatoethyl methacrylate | 91 | 136 | 58 | | | | |
| m-Isopropenyl-α,α-dimethyl-benzyl isocyanate | | | | 40 | 55 | | |
| Part III | | | | | | | |
| tert.-Butyl peroctoate (70%) | 70 | 70 | 70 | 76 | 76 | 70 | 70 |
| Butyl acetate | 79 | 79 | 79 | | | 79 | 79 |
| Xylene | | | | 58 | 58 | | |
| Reaction temperature (°C.) | 110 | 110 | 110 | 115 | 115 | 115 | 115 |
| Solids content (%) | 59.9 | 59.7 | 59.9 | 64.8 | 65.4 | 59.5 | 59.6 |
| Viscosity (mPa.s, 23° C.) | 1139 | 1776 | 3347 | 21255 | 6067 | 3975 | 22708 |
| Isocyanate content of the solids (%) | 2,0 | 3,1 | 1,3 | 0,6 | 0,9 | 1,8 | 1,8 |
| Anhydride content of the solids ($C_4H_2O_3$, %) | 4,7 | 7,2 | 6,8 | 10,5 | 9,6 | 12,3 | 14,2 |

The binders according to the invention, preferably dissolved in inert solvents or diluents, generally have a pot life of several hours and will harden even at room temperature with concomitant evaporation of any solvents present to form coatings with superior mechanical properties. This process of drying may, if desired, be shortened by raising the temperature to values up to 100° C. so that drying times of 10 to 30 minutes are obtained.

The binders according to the invention may be used directly for the production of clear coatings without any further additives but the conventional auxiliary agents and additives employed in the lacquer industry, such as fillers, levelling agents, anti-oxidants, UV light absorbents and pigments are generally added. The two-component systems thus obtained in a condition ready for use may be applied to any untreated or pretreated surfaces such as metal, wood, glass, ceramics, stone, concrete, plastics, textiles, leather, cardboard or paper by conventional methods such as spraying, spread coating, immersion, flooding, pouring or roller application.

In the examples which follow, all percentages and parts are based on weight unless otherwise indicated.

I General method of preparation for copolymers $A_1$–$A_7$ containing isocyanate and anhydride groups Part I is introduced into a three liter reaction vessel equipped with stirrer, condenser and heating means and heated to the reaction temperature. Part II (addition over a total period of 2 hours) and Part III (addition over a total period of 2.5 hours) are then added simultaneously and the mixture is stirred for 2 hours at the reaction temperature.

II Method of preparation of components (B) containing hydroxyl groups and optionally containing amino groups II.1 Preparation of the starting materials II.1.1 Reaction products of diisocyanates and N,N-dimethylethanolamine Product $b_1$: Reaction product of 1-isocyanato-1-methyl-4(3)-isocyanatomethylcyclohexane and N,N-dimethylethanolamine.

388 g of 1-Isocyanato-1-methyl-4(3)-isocyanatomethylcyclohexane are introduced under a nitrogen atmosphere into a 1 l four-necked flask equipped with stirrer, dropping funnel, reflux condenser and thermometer. 178 g of N,N-dimethylethanolamine are then added dropwise at 25° C. over a period of 2 hours with stirring. A liquid, colourless reaction product is obtained after 3 hours' stirring at 25° C.

Product $b_2$: Reaction product of isophorone diisocyanate and N,N-dimethylethanolamine.

A reaction product is prepared analogously to Product $b_1$ from 444 g of isophorone diisocyanate and 178 g of N,N-dimethylethanolamine.

II.1.2 Reaction products of polyols and ε-caprolactone

Product $b_3$: Reaction product of trimethylolpropane and ε-caprolactone.

268 g of trimethylolpropane, 456 g of ε-caprolactone and 0.2 g of tin dioctoate are stirred together for 5 hours in a 1 l glass flask at 150° C. A colourless, viscous product having an OH number of 464 is obtained.

Product $b_4$: Reaction product of trimethylolpropane and ε-caprolactone.

402 g of trimethylolpropane and 342 g of ε-caprolactone are reacted together as described for the preparation of product $b_3$. A colourless, viscous product having an OH number of 677 is obtained.

Product $b_5$: Reaction product of glycerol and $\epsilon$-caprolactone.

368 g of glycerol are reacted with 456 g of $\epsilon$-caprolactone as described for the preparation of Product $b_3$.

A colourless, viscous product having an OH number of 815 is obtained.

II.2 Preparation of components (B)

Component $B_1$: Prepared from Product $b_1$ and Product $b_3$ 290 g of $b_3$ and 226 g of $b_1$ are stirred together for 3 hours at 100° C. in a 1 l glass flask. A colourless, viscous product having an OH number of 173 is obtained.

Component $B_2$: Prepared from Product $b_2$ and Product $b_3$

From 290 g of $b_3$ and 249 g of $b_2$ by a method analogous to the preparation of component $B_1$. Colourless, viscous product having an OH number of 166.

Component $B_3$: Prepared from Product $b_2$ and Product $b_4$

Prepared analogously to component $B_1$ from 300 g of $b_4$ and 376 g of $b_2$. Slightly yellowish, viscous product having an OH number of 200.

Component $B_4$: Prepared from Product $b_1$ and Product $b_5$

Prepared analogously to component $B_1$ from 233 g of $b_5$ and 321 g of $b_1$. Slightly yellowish, viscous product having an OH number of 229.

Component $B_5$: Prepared from Product $b_2$ and Product $b_5$

Prepared analogously to component $B_1$ from 309 g of $b_5$ and 466 g of $b_2$. Slightly yellowish, viscous product having an OH number of 216.

Component $B_6$: Prepared from triethanolamine and $\epsilon$-caprolactone 149 g of triethanolamine and 342 g of $\epsilon$-caprolactone are weighed into a 1 l glass flask and stirred for 4 hours at 140° C. A yellow, viscous product having a hydroxyl number of 340 is obtained.

Component $B_7$: Prepared from N-butyldiethanolamine and $\epsilon$-caprolactone 161 g of N-butyldiethanolamine and 228 g of $\epsilon$-caprolactone are weighed into a 1 l glass flask and stirred for 3 hours at 140° C. A yellow, viscous product having a hydroxyl number of 288 is obtained.

Component $B_8$: Prepared from methyl-bis-(3-aminopropyl)amine and ethylene carbonate 352 g of ethylene carbonate are introduced into a 2 l four-necked flask equipped with stirrer, dropping funnel, reflux condenser and thermometer, and the ethylene carbonate is heated to 100° C. 290 g of methyl-bis-(3-aminopropyl)amine are added dropwise with stirring within 2 hours. Stirring is then continued for a further 2 hours at 100° C. The slightly yellowish product obtained is diluted to a solids content of 70% with N-methylpyrrolidone and then has an OH number of 244.

Component $B_9$: Prepared from methyl-bis-(3-aminopropyl)amine and propylene carbonate Prepared analogously to component $B_8$ from 408 g of propylene carbonate and 290 g of methyl-bis-(3-aminopropyl)-amine.

The slightly yellowish product obtained is diluted to a solids content of 70% with diethylglycol dimethylether and then has an OH number of 232.

Component $B_{10}$: Prepared from methyl-bis-(3-aminopropyl)amine and glycerol carbonate Prepared analogously to component $B_8$ from 472 g of glycerol carbonate and 290 g of methyl-bis-(3-aminopropyl)-amine. A slightly yellowish, viscous product having an OH number of 588 is obtained.

Component $B_{11}$: Butane-1,4-diol

Component $B_{12}$: Bis-hydroxymethyl-hexahydro-4,7-methanoindane

III. Preparation of the binder combinations according to the invention

Components (A) containing isocyanate and anhydride groups, polyol components (B) and optionally catalyst components (C) (in some examples, N,N-dimethylethanolamine is used as component (C)) are mixed together at room temperature and if necessary adjusted to a workable viscosity by the addition of an organic solvent or diluent.

The films are spread over glass plates by a film drawing apparatus; the wet film thickness if 120 $\mu$m. Films which have been drawn over the plates at room temperature are all completely dried to a tack-free state after 60 minutes at the latest. After ageing, i.e. about 24 hours' drying at room temperature, clear, cross-linked films with excellent mechanical properties are obtained.

All the lacquer mixtures prepared had a pot life of several hours.

Table II below shows the compositions of the binder combinations and the solvent resistance as a measure of the degree of cross-linking.

The solvent resistance is tested by a wipe test using a wad of cotton wool soaked in methyl isobutyl ketone (MIBK). The result is given in terms of the number of double strokes at the end of which the film remains without visible change. Not more than 200 double strokes were carried out per film.

TABLE II

| Examples of use | 1 | 2 | 3 | 4 | 5 | 6 |
|---|---|---|---|---|---|---|
| Component (A) | 50.0 g $A_1$ | 50.0 g $A_1$ | 50.0 g $A_1$ | 50.0 g $A_1$ | 50.0 g $A_1$ | 50.0 g $A_1$ |
| Component (B) | 4.9 g $B_6$ | 5.8 g $B_7$ | 9.6 g $B_1$ | 10.1 g $B_2$ | 8.4 g $B_3$ | 7.8 g $B_5$ |
| Butyl acetate | 5.0 g | 5.0 g | 5.0 g | 5.0 g | 5.0 g | 5.0 g |
| Pot life | >2 h | >2 h | >3 h | >3 h | >3 h | >3 h |
| Appearance of the film | clear | clear | clear | clear | clear | clear |
| MIBK wipe test after 24 hours at room temperature, number of double strokes: | 150 | >200 | >200 | 190 | 200 | >200 |
| Molar ratio (NCO + anhydride): OH | 1:1 | 1:1 | 1:1 | 1:1 | 1:1 | 1:1 |

| Example of use | 7 | 8 | 9 | 10 | 11 | 12 |
|---|---|---|---|---|---|---|
| Component (A) | 50.0 g $A_2$ | 50.0 g $A_2$ | 50.0 g $A_2$ | 50.0 g $A_2$ | 50.0 g $A_2$ | 50.0 g $A_2$ |
| Component (B) | 7.2 g $B_6$ | 8.5 g $B_7$ | 14.1 g $B_1$ | 14.7 g $B_2$ | 12.3 g $B_3$ | 11.3 g $B_5$ |
| Butyl acetate | 10.0 g | 10.0 g | 10.0 g | 10.0 g | 10.0 g | 10.0 g |

TABLE II-continued

| | | | | | | |
|---|---|---|---|---|---|---|
| Pot life | >2 h | >2 h | >3 h | >3 h | >3 h | >3 h |
| Appearance of the film | clear | clear | clear | clear | clear | clear |
| MIBK wip test after 24 hours at room temperature, number of double strokes: | 170 | >200 | >200 | >200 | >200 | >200 |
| Molar ratio (NCO + anhydride): OH | 1:1 | 1:1 | 1:1 | 1:1 | 1:1 | 1:1 |

| Example of use | 13 | 14 | 15 | 16 | 17 | 18 |
|---|---|---|---|---|---|---|
| Component (A) | 50.0 g $A_3$ | 50.0 g $A_3$ | 50.0 g $A_4$ | 50.0 g $A_4$ | 50.0 g $A_5$ | 50.0 g $A_5$ |
| Component (B) | 2.4 g $B_{12}$ | 1.1 g $B_{11}$ | 10.0 g $B_9$ | 9.2 g $B_8$ | 8.9 g $B_8$ | 10.0 g $B_5$ |
| N,N-Dimethylethanolamine | 0.5 g | 0.5 g | | | | |
| Butyl acetate | 5.0 g | 5.0 g | | | | 10.0 g |
| Xylene | | | 5.0 g | 5.0 g | | |
| N-methylpyrrolidone | | | | | 5.0 g | |
| Pot life | >3 h | >3 h | >2 h | >2 h | >2 h | >2 h |
| Appearance of the film | clear | clear | clear | clear | clear | clear |
| NIBK wipe test after 24 h at room temperature, number of double strokes: | >200 | >200 | 160 | >200 | >200 | 120 |
| Molar ratio (NCO + anhydride): OH | 1:1 | 1:1 | 1:1 | 1:1 | 1:1 | 1:1 |

| Example of use | 19 | 20 | 21 | 22 |
|---|---|---|---|---|
| Component (A) | 10.0 g $A_6$ | 50.0 g $A_6$ | 50.0 g $A_7$ | 50.0 g $A_7$ |
| Component (B) | 13.5 g $B_4$ | 5.3 g $B_{10}$ | 17.0 g $B_4$ | 5.2 g $B_{10}$ |
| Methyl ethyl ketone | 15.0 g | | 15.0 g | |
| N-Methylpyrrolidone | | 10.0 g | | 10.0 g |
| Pot life | >2 h | >2 h | >3 h | >3 h |
| Appearance of the film | clear | clear | clear | clear |
| MIBK wipe test after 24 h at room temperature, number of double strokes: | >200 | 180 | >200 | >200 |
| Molar ratio (NCO + anhydride): OH | 1:1 | 1:1 | 1:1 | 1:1 |

What is claimed is:

1. Copolymers having a weight average molecular weight, determined by the gel permeation chromatography method, of from 1500 to 75,000 of olefinically unsaturated compounds containing chemically incorporated moieties capable of undergoing an addition reaction with hydroxyls wherein the copolymers contain, as hydroxyl reactive groups, both
   (i) from 0.3 to 7.0% by weight of free isocyanate groups and
   (ii) from 1 to 25% by weight of acid anhydride groups, calculated as $C_4H_2O_3$,
in a chemically bound form.

2. In the process for preparation of copolymers according to claim 1 by the copolymerization of a mixture of olefinically unsaturated compounds at 60° to 200° C. in the presence of compounds which initiate the polymerization reaction, the improvement comprises said mixture of olefinically unsaturated compounds being one which consists essentially of
   (a) from 1 to 25 parts by weight of copolymerizable monoolefinically unsaturated mono- or polyisocyanate monomers,
   (b) from 1 to 25 parts by weight of copolymerizable itaconic acid anhydride or maleic acid anhydride monomers and
   (c) from 50 to 98 parts by weight of monomers which are free from isocyanate groups and acid anhydride groups and are inert to isocyanate and anhydride groups.

3. Process according to claim 2 wherein the isocyanate monomers (a) are isocyanatoethyl methacrylate, bis-(2-isocyanatoethyl)-fumarate, m-isopropenyl-α,α-dimethylbenzylisocyanate, or mixtures thereof.

4. Process according to claim 2 wherein maleic acid anhydride is the anhydride monomer (b).

* * * * *